United States Patent [19]
Hohne

[11] 3,829,068
[45] Aug. 13, 1974

[54] DEVICE FOR THE DISTRIBUTION OF GAS IN A LIQUID

[76] Inventor: Rudolf Hohne, 18 Springvale Rd., Glen Waverly, Victoria, Australia

[22] Filed: Sept. 18, 1970

[21] Appl. No.: 73,530

[52] U.S. Cl.............................. 261/36 R, 261/124
[51] Int. Cl............................................. B01f 3/04
[58] Field of Search261/37, DIG. 54, 124, DIG. 75, 261/77, 91; 55/230, 242; 239/214.21, 434, 568, 544; 417/72, 71

[56] References Cited
UNITED STATES PATENTS

| | | | |
|---|---|---|---|
| 1,083,057 | 12/1913 | Clawson.......................... | 55/230 UX |
| 1,569,580 | 1/1926 | Scheminger, Jr. ............. | 239/214.21 |
| 1,865,991 | 7/1932 | Winkler.............................. | 261/90 |
| 1,919,847 | 7/1933 | Kunz.................................. | 417/72 |
| 1,963,122 | 6/1934 | Fagergren........................ | 261/93 X |
| 2,241,460 | 5/1941 | Huntley........................... | 417/71 |
| 2,289,953 | 7/1942 | Aldridge.......................... | 261/77 X |
| 2,372,611 | 3/1945 | Stockstrom et al.............. | 239/544 |
| 2,708,571 | 5/1955 | Fischerstrom et al. ........... | 261/124 |
| 2,715,521 | 8/1955 | Tatibana........................... | 261/77 X |
| 2,770,501 | 11/1956 | Coanda............................. | 239/434 X |
| 2,868,523 | 1/1959 | Cundiff et al....................... | 261/77 |
| 3,365,178 | 1/1968 | Bood................................ | 261/DIG. 75 |
| 3,503,593 | 3/1970 | Nelson............................. | 261/DIG. 75 |
| 3,517,485 | 6/1970 | Dell'Agnese et al............. | 55/242 X |
| 3,521,864 | 7/1970 | Welles, Jr. ...................... | 261/DIG. 75 |
| 3,597,135 | 8/1971 | Kweller et al.................... | 239/568 X |
| 3,599,398 | 8/1971 | Jaeger............................. | 261/DIG. 54 |
| 3,628,775 | 12/1971 | McConnell et al................. | 261/77 |
| 3,643,403 | 2/1972 | Speece........................... | 261/DIG. 75 |
| 3,691,230 | 9/1972 | Wesselingh..................... | 261/DIG. 75 |

FOREIGN PATENTS OR APPLICATIONS

| | | | |
|---|---|---|---|
| 111,431 | 8/1925 | Switzerland................... | 261/DIG. 75 |
| 1,377,571 | 9/1964 | France.......................... | 261/DIG. 75 |

*Primary Examiner*—Tim R. Miles
*Assistant Examiner*—Richard L. Chiesa
*Attorney, Agent, or Firm*—Markva & Smith

[57] ABSTRACT

A specific embodiment of a device is disclosed for the distribution of gas in a liquid which is contained in a tank having a bottom and side wall. A gas flow chamber includes an annular, hollow body having an outer wall, an inner wall, a partition wall between said inner and outer walls and a top wall having a plurality of holes. A liquid flow chamber has liquid inlet means and liquid outlet means and is fixedly mounted with respect to the gas flow chamber. A pump is used for causing the liquid to flow out of the tank through the stationary flow chamber and out of the liquid outlet means back into the tank. The gas outlet means includes a plurality of straight, vertically extending tubes closed at the top and registered at the bottom with the holes located in the top wall of the annular, hollow body. The vertically extending tubes are spaced with respect to each other around the top wall of the annular body so that there are gaps between adjacent tubes. The vertically extending tubes include said plurality of gas openings which are arranged to face the gaps between the tubes. A substantially uniform flow of gas is directed through the openings and gas bubbles are removed directly at the gas openings by a flow of liquid which is passing out of the liquid outlet means. The gas bubbles are removed directly at the openings with a minimum amount of turbulence.

9 Claims, 2 Drawing Figures

PATENTED AUG 13 1974　3,829,068

INVENTOR.
RUDOLF HÖHNE
BY
Lowry, Rinehart, Markva & Smith
ATTORNEYS

DEVICE FOR THE DISTRIBUTION OF GAS IN A LIQUID

BACKGROUND OF THE INVENTION

This invention relates to a device for the distribution of gas in a liquid with the aid of a pump which circulates the liquid in a tank. The device is especially suitable for large volumes of gas as are used for instance in the yeast industry, where large quantities of air are to be blown into liquids to stimulate the yeast growth.

The efficiency of such a distributor device depends to a large extent on how fine the gas is distributed through the gas outlets and how fast the formed gas bubbles are taken away from said outlets. It is, therefore, of advantage to employ a very large number of gas outlets and to remove the gas bubbles from the gas outlets forcibly. To attain this end, the liquid should be made to flow past the gas outlets, thereby to remove the gas bubbles from the gas outlets in a simple and reliable manner. It has proved advantageous to have the flow velocity of the gas in the gas outlets equal to or smaller than the velocity of the liquid at the gas outlets. In this way the gas will be finely distributed in, and intensively mixed with, the liquid.

The known processes of bringing gas and liquid into contact with each other reveal, on closer examination, that the creation of small bubbles directly at the gas outlets is not at all aimed for by most of the devices used in industry. Amongst other things the flow velocity of the gas in the gas outlets is generally much too high.

In contrast to the many known devices having a rotating gas distributor, the distributor device according to the invention is stationary. Stationary distributor devices are generally not advantageous because the formation of the gas bubbles at the gas outlets depends to a great extent on the natural ascending force of the gas bubbles. Moreover, the need for all the distributor elements, e.g., tubes, to be situated in a horizontal plane or to have separate gas supply pipes complicates the known devices.

SUMMARY OF THE INVENTION

It is the object of the invention to eliminate the above-mentioned disadvantages and to provide a device for the distribution of gas in a liquid, which is simple in construction, easy to operate and which will effectively and efficiently perform the purposes for which it is intended.

To attain this object the present invention provides a device for the distribution of gas in a liquid contained in a tank having a bottom and a side wall, said device comprising a pump for circulating the liquid in said tank; a ring-like hollow body disposed in the tank so as to extend horizontally above the bottom thereof and having an outer wall, an inner wall, a partition wall between said walls and a top wall provided with a plurality of holes; a gas supply pipe opening into said ring-like hollow body, and a plurality of straight, vertically extending tubes closed on top, provided with a plurality of gas outlets, mounted on the top wall of the ring-like hollow body for communication therewith by said holes, and leaving gaps between adjacent tubes, said gas outlets in the tubes being arranged so as to face said gaps between said tubes.

The tubes may be closed on top by a funnel which covers the whole device at the same time.

In a preferred embodiment the partition wall has a height smaller than that of the outer wall of the ring-like hollow body.

In accordance with a further aspect of the invention the tubes may be a streamlined profile.

BRIEF DESCRIPTION OF THE DRAWING

An embodiment of the invention will now be described by way of example and with reference to the accompanying drawing, in which.

DESCRIPTION OF THE PREFERRED EMBODIMENT

Figure 1:
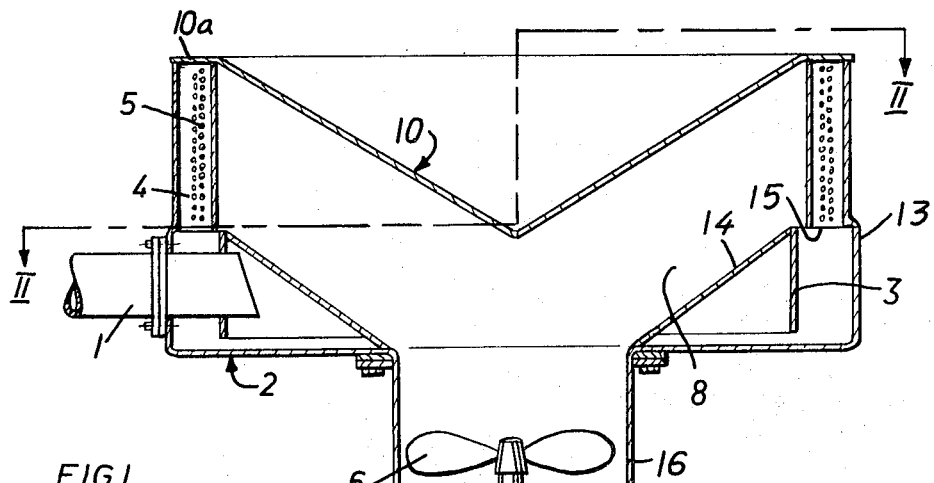
FIG. 1 is a vertical section of a device according to the invention.
Figure 2:
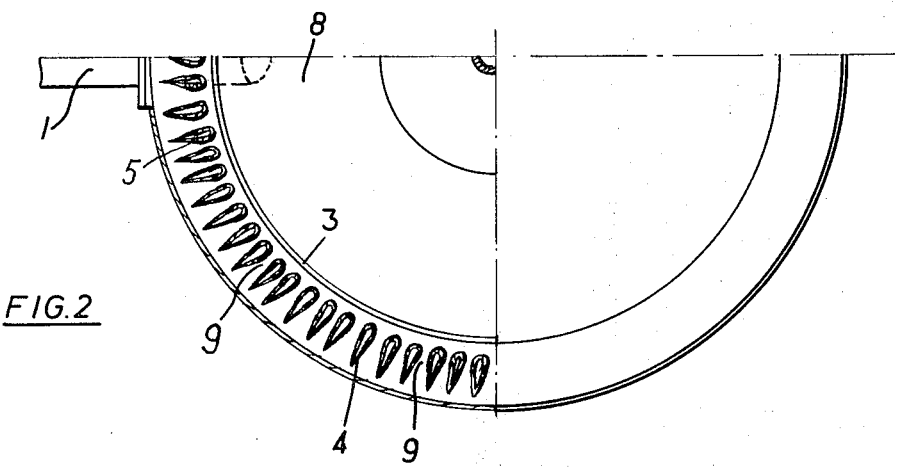
FIG. 2 is a section on the line II — II of FIG. 1.

More specifically, reference being made to the drawings, the device, made in accordance with this invention, is used for the distribution of gas in a liquid which is contained in a tank having a bottom 7 and a side wall 12. Only a portion of the side wall 12 is shown in the drawings. The gas-liquid mixing portion of the device includes a liquid flow chamber 8 having liquid inlet means 16 and liquid outlet means 9. A gas flow chamber includes an annular, hollow body, generally designated 2, which is disposed in the tank so as to extend horizontally above the tank bottom 7. The ring-like or annular, hollow body 2 includes an outer wall 13, an inner wall 14, a partition wall 3 between said inner and outer walls 13 and 14, and a top wall 15 having a plurality of spaced apart holes (not numbered).

The gas flow chamber also includes gas outlet means constituted by a plurality of straight, vertically extending tubes 4 which are closed at the top and registered at the bottom with the holes located in the top wall 15 of the annular, hollow body 2. The vertically extending tubes 4 include a plurality of openings or gas outlets 5 which are in communication with the annular, hollow body tube through the holes in the top wall 15 for directing gas into a liquid flowing through the liquid outlet means 9. The vertically extending tubes are spaced with respect to each other around the top of the annular, hollow body 2 thereby leaving gaps 9 which constitute said liquid outlet means between the adjacent tubes 4. The plurality of gas openings or outlets 5 are arranged on the tubes 4 to face the gaps 9 located between the tubes 4.

Means is provided for directing a substantially uniform flow of gas through the openings 5. That is, a pressurized gas is delivered to the ring-like, hollow body tube through a gas supply pipe 1 into the area between the partition wall 3 and the inner wall 14. The partition wall 3 has a height smaller than that of the outer wall 13 so that the incoming pressurized gas may be distributed substantially uniformly up through the holes of the top wall 15 and out through the gas openings or outlets 5 as discussed hereinbelow.

Means is provided for directing liquid from the tank through the liquid flow chamber and past the openings 5 where gas bubbles are removed directly at the openings 5 with a minimum amount of turbulence and distributed into the liquid. The liquid directing means is constituted by the pump 6 which sucks liquid from a location directly above the tank bottom 7 and delivers it into the chamber 8 through the fixedly mounted duct member 16 mounted within the annular, hollow body 2. The duct member 16 constitutes the liquid inlet means for the liquid flow chamber. The liquid is directed through the chamber 8 and out of the gaps or liquid outlet means 9 back into the tank.

In this specific embodiment, a cover member, generally designated 10, includes a funnel portion and a tube cover portion 10a. The funnel portion constitutes the top of the chamber 8. The upper ends of the tubes 4 are commonly covered by the tube cover portion 10a. However, it is within the contemplation of the invention that each tube 4 may have a separate cover rather than having a single common cover portion 10a.

As discussed herein and as evident in the drawings, the liquid flow chamber and the gas flow chamber are fixed with respect to each other and with respect to the tank.

In the device proposed by the invention it is of advantage that the liquid in the tank is circulated by the pump 6 and the flowing liquid removes the gas bubbles from the gas outlets 5. At the same time pressure is reduced at the gas outlets 5 to such an extent that it is possible to have the distributor tubes 4 mounted vertically, so that a comparatively large number of tubes and a large number of gas outlets can be employed to special advantage. A further advantage lies in the fact that the device needs only one gas supply pipe.

The liquid, which is pumped into the chamber 8 formed by the hollow body and possibly the funnel, can only escape through the gaps between the tubes 4 and in the process it removes the gas bubbles from the gas outlets 5. The desired low pressure at the gas outlets 5 is created by the increased velocity of the liquid in the gaps.

The partition wall 3 ensures that the gas is evenly distributed within the hollow body 2. The incoming gas must be sufficiently pressurized to pass the partition wall and subsequently to flow into the tubes 4 and through the gas outlets 5 into the liquid. There must be the minimum possible turbulence near the tubes. For this reason the latter are shown to have a streamlined profile.

The device can be installed in almost any tank. It is of advantage that the pump 6 can also be positioned outside the tank. The device lies relatively high above the bottom of the tank. The backpressure of the gas is correspondingly low and liquid de-aerated to a great extent is sucked into the pump. The zone below the distributor device is especially suited for the installation of heat exchanger elements.

The following two examples describe the practical usefulness of the device in the manufacture of baker's yeast:

1. In a tank of 4.5m. diameter and 6m. height more than 12,000kg. of commercial yeast can be produced from 5kg. of seed yeast in 30 hours. The final liquid is completely free of alcohol. The installed distributor body has a diameter of 1.5m. Total power consumption for the air-compression and the drive of the pump is approximately 0.12 kWh pro kg. of compressed yeast.

2. In a tank of 4.5m. diameter and 6m. height approximately 12,000kg. of commercial yeast can be produced from 1,700kg. of seed yeast in 14 hours. The fermentation is practically free of alcohol. Air consumption pro kilogram of compressed yeast is approximately 3.5Nm$^3$.

The invention may be embodied in other specific forms without departing from the spirit or essential characteristics thereof. The embodiment is therefore to be considered in all respects as illustrative and not restrictive.

What is claimed is:

1. A device for the distribution of gas in a liquid comprising:
   a. a tank having a bottom and side wall for containing liquid,
   b. a liquid flow chamber having liquid inlet means and liquid outlet means,
   c. a gas flow chamber including gas outlet means having a plurality of openings for directing gas into a liquid flowing through said liquid outlet means,
   d. said gas flow chamber including an annular, hollow body disposed in the tank so as to extend horizontally above said tank bottom,
   e. said annular, hollow body including an outer wall, an inner wall, a partition wall between said inner and outer walls, and a top wall having a plurality of holes,
   f. said liquid flow chamber and said gas flow chamber being fixed with respect to each other and with respect to the tank,
   g. means for directing a substantially uniform flow of gas through said openings, and
   h. means for directing liquid from the tank through the liquid flow chamber and past the openings to remove gas bubbles directly at the openings with a minimum amount of turbulence.

2. A device as defined in claim 1 wherein
   said gas outlet means includes a plurality of straight, vertically extending tubes closed at the top and registered at the bottom with the holes located in the top wall of said annular, hollow body,
   said vertically extending tubes being spaced with respect to each other so that there are gaps between adjacent tubes,
   said vertically extending tubes including said plurality of gas openings which are arranged to face the gaps between said tubes.

3. A device as defined in claim 2 wherein
   the straight, vertically extending tubes have a streamlined profile.

4. A device for the distribution of gas in a liquid comprising:
   a. a tank having a bottom and side wall for containing liquid,
   b. a liquid flow chamber having liquid inlet means and liquid outlet means,
   c. a gas flow chamber including gas outlet means having a plurality of openings for directing gas into a liquid flowing through said liquid outlet means,
   d. said gas flow chamber including an annular, hollow body disposed in the tank so as to extend horizontally above said tank bottom,
   e. said liquid inlet means including a fixedly mounted duct member mounted within said annular, hollow body,
   f. said gas outlet means including a plurality of straight, vertically extending tubes closed at the top and mounted on the top of the annular, hollow body,
   g. said annular, hollow body including a top wall and holes located in the top wall and being registered with the bottom of said vertically extending tubes, h. said tubes being spaced with respect to each other around the top of said annular, hollow body thereby leaving gaps which form said liquid outlet means between adjacent tubes, i. said plurality of gas openings being located in the tubes in an arrangement so as to face the gaps between said tubes, j. said liquid flow chamber and said gas flow chamber being fixed with respect to each other and with respect to the tank, k. means for directing a substantially uniform flow of gas through said openings, and l. means for directing liquid from the tank through the liquid flow chamber and past the openings to remove gas bubbles directly at the openings with a minimum amount of turbulence.

5. A device for the distribution of gas in a liquid comprising:
   a. a tank having a bottom and side wall for containing liquid,
   b. a liquid flow chamber having liquid inlet means and liquid outlet means,
   c. a gas flow chamber including gas outlet means having a plurality of openings for directing gas into a liquid flowing through said liquid outlet means,
   d. said gas flow chamber including an annular, hollow body having an outer wall, an inner wall, a partition wall disposed between said inner and outer walls and a top wall provided with a plurality of holes,
   e. said partition wall having a height smaller than that of the outer wall,
   f. said annular body including a means for supplying a flow of gas within the area between the partition wall and said inner wall,
   g. said liquid flow chamber and said gas flow chamber being fixed with respect to each other and with respect to the tank,
   h. means for directing a substantially uniform flow of gas through said openings, and
   i. means for directing liquid from the tank through the liquid flow chamber and past the openings to remove gas bubbles directly at the openings with a minimum amount of turbulence.

6. A device for the distribution of gas in a liquid which is contained in a tank having a bottom and side wall, said device comprising:
   a. a liquid flow chamber having liquid inlet means and liquid outlet means,
   b. a gas flow chamber including gas outlet means having a plurality of openings for directing gas into a liquid flowing through said liquid outlet means,
   c. said gas flow chamber including an annular, hollow body having an outer wall, an inner wall, a partition wall between said inner and outer walls and a top wall having a plurality of holes,
   d. said liquid flow chamber and said gas flow chamber being fixed with respect to each other,
   e. means for directing a substantially uniform flow of gas through said openings, and
   f. means for directing liquid from the tank through the liquid flow chamber and past the openings to remove gas bubbles directly at the openings with a minimum amount of turbulence.

7. A device as defined in claim 6 wherein
said gas outlet means includes a plurality of straight, vertically extending tubes closed at the top and registered at the bottom with the holes located in the top wall of said annular, hollow body,
said vertically extending tubes being spaced with respect to each other so that there are gaps between adjacent tubes,
said vertically extending tubes including said plurality of gas openings which are arranged to face the gaps between said tubes.

8. A device as defined in claim 7 wherein
the straight, vertically extending tubes have a streamlined profile.

9. A device for the distribution of gas in a liquid which is contained in a tank having a bottom and side wall, said device comprising:
   a. a liquid flow chamber having liquid inlet means and liquid outlet means,
   b. a gas flow chamber including gas outlet means having a plurality of openings for directing gas into a liquid flowing through said liquid outlet means,
   c. said gas flow chamber including an annular, hollow body having an outer wall, an inner wall, a partition wall disposed between said inner and outer walls and a top wall provided with a plurality of holes,
   d. said partition wall having a height smaller than that of the outer wall,
   e. said annular body including a means for supplying a flow of gas within the area between the partition wall and said inner wall,
   f. said liquid flow chamber and said gas flow chamber being fixed with respect to each other,
   g. means for directing a substantially uniform flow of gas through said openings, and
   h. means for directing liquid through the liquid flow chamber and past the openings to remove gas bubbles directly at the openings with a minimum amount of turbulence.

* * * * *